Jan. 18, 1938.  G. O. ENOCHSON  2,105,687
LATHE ATTACHMENT
Original Filed July 17, 1933
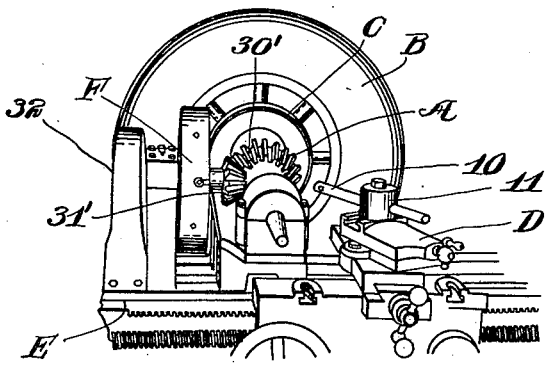
Fig. 1
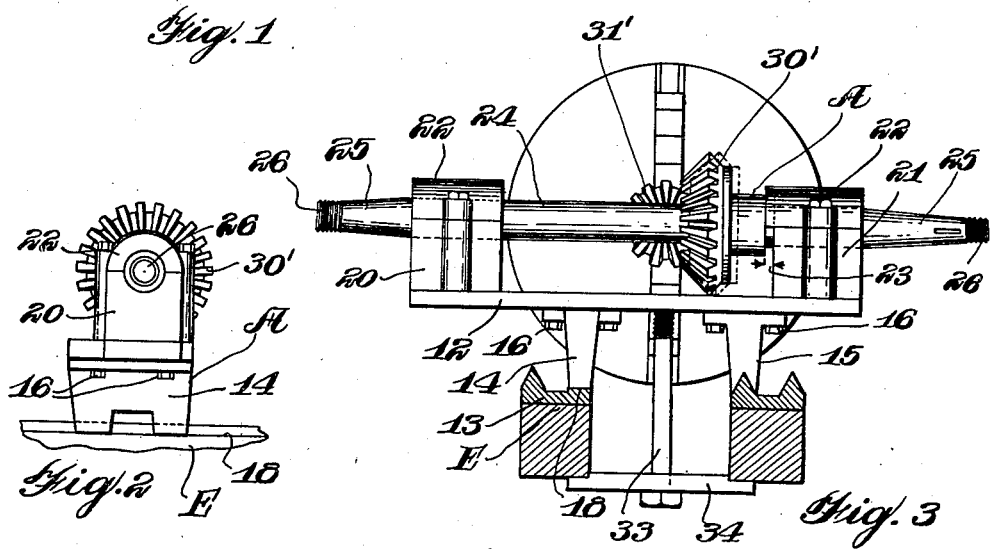
Fig. 2  Fig. 3
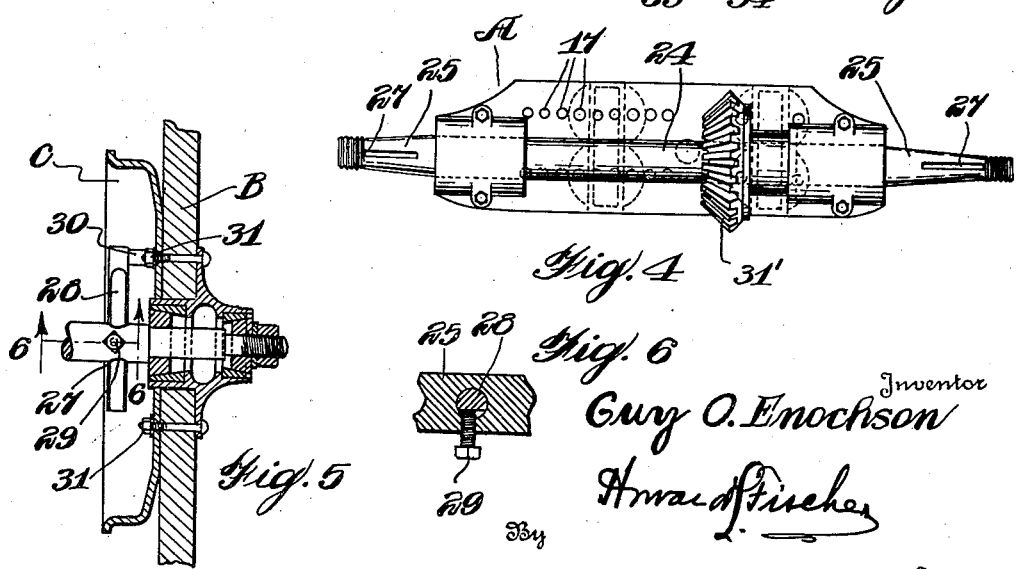
Fig. 4
Fig. 5  Fig. 6
Inventor
Guy O. Enochson
By Howard Fischer
Attorney Patented Jan. 18, 1938

2,105,687

UNITED STATES PATENT OFFICE 2,105,687

LATHE ATTACHMENT

Guy O. Enochson, Austin, Minn.

Substitute for abandoned application Serial No. 680,803, July 17, 1933. This application February 6, 1937, Serial No. 124,528

3 Claims. (Cl. 82—34)

This invention relates to an adjustable lathe attachment which will fit virtually any lathe and which is adapted to support an automobile wheel in a manner so that the wheel or brake drum may be trued. The lathe attachment may be quickly and readily secured to any lathe owing to its adjustable nature and it provides a simple, inexpensive means of supporting an automobile wheel in a manner so that the power from the lathe can drive an arbor of the device which supports the wheel, thus permitting the brake drum of the wheel to be readily trued as well as permitting the truing of wire spoked wheels or the like.

A feature resides in providing an adjustable lathe attachment which is formed with adjustable legs or supports extending from the base of the device, while the arbor which supports the wheel is carried in suitable journals projecting from the base. The adjustable supports or legs are adapted to fit the prismatic V ways of the lathe bed and the flat way which makes the device easy to attach to any lathe. One of the supporting legs of the device slides on one of the prismatic V ways while the other has a flat end which fits the flat way of the lathe and thus the device is supported so that it may slide along the lathe bed without interfering with the tool carriage which also slides on the lathe bed.

This adjustable lathe attachment is provided with a base member which has two bearings adapted to support the arbor so that it is free to rotate in the same. The arbor is adjustable in these bearings to permit the gear which is carried by the arbor between the two bearings to be set in proper alinement with a pinion which is carried by the lathe chuck or head stock spindle, so that the pinion may drive the arbor to rotate the same through the pinion by the operation of the lathe.

A feature of my lathe attachment resides in providing one bearing block of a narrower width than the other, whereas the caps for the bearing blocks are the same length and are interchangeable on the bearing blocks. The gear on the arbor between the bearing blocks is set to bear against one of the caps so that the thrust is against the end of the cap in operation toward the shorter bearing. Thus when the bearing cap is removed from this shorter block, the arbor may be shifted with the gear which is keyed thereto toward the shorter bearing block, moving the gear out of mesh with the driving pinion. If it is desired to remove the arbor with the wheel attached to the end of the same, the other bearing lock cap may be removed and the arbor lifted off of the bearing block. This is an important feature of the attachment.

The legs which adjustably support the base of the attachment on the lathe bed are bolted to the base and when they are adjusted to the prismatic V way and flat way of the particular lathe to which the attachment is to be secured, they are locked to the base of the attachment to hold them rigid in place. This permits the easy adjustment of the supports for the arbor of the attachment, both as to the width of the tracks on the lathe, as well as squaring the arbor shaft in relation to the carriage of the lathe. Thus in truing the brake drum of an automobile wheel, a perfect machine cut may be made which is absolutely true with the shaft which supports the wheel and which is represented by the arbor when the wheel is supported by the same. By this means I overcome cutting the brake drum thinner on one side than on the other when it is trued by my device, and I also overcome the imperfect machining of the same. The securing and attachment of my lathe device is simple and may be done very readily by the ordinary machinist who is capable of operating a lathe.

It is also a feature to provide an anchoring bolt which extends through the arbor supporting base and permits a cross bar to be locked under the bed of the lathe to hold the arbor base in locked rigid position after it has been alined and set in proper relation to the lathe bed to hold the particular wheel drum which is desired to be machined and trued.

It is also a feature of my lathe attachment to provide a shaft which carries the driving pinion with a straight cylindrical-like portion adjacent the collar which supports the pinion on the same. The end of the shaft is tapered off to fit the lathe with which it is to be used. Thus the shaft which supports the driving pinion may fit into the taper of the head stock spindle of the lathe, or the cylindrical portion of the shaft may be engaged by the lathe chuck. This gives a quick easy attachment and adjustment for the driving pinion. When the taper of the pinion shaft is fit into the head stock spindle, a lathe dog is used to positively drive and key the shaft to the head through the face plate.

It is also a feature of this attachment to provide a double tapered arbor shaft. This gives two different sized ends for different hubs. The arbor may be reversed in the bearing blocks into the position desired, and as many different types of arbors as are desirable may be provided, each arbor having ends of different sizes, minimizing the numbers of arbors required. The tapered ends of the arbor are provided with a recess into which a key is adapted to fit so as to hold the wheel through one of the key slots on the wheel hub so that it is not necessary to have as tight a fit on the arbor as would otherwise be necessary to hold the wheel in a manner to turn when the arbor is rotated by the pinion. This is an advantage in attaching and disengaging the wheel from the arbor because the wheel does not have to engage the arbor so tightly and makes it easier to remove the wheel hub from the arbor.

A further adjacent of my attachment resides in providing means for supporting the front wheels to the arbor with the bearings holding the wheel on the arbor. When one of the front wheels is held in this manner an L-shaped key is used, one end of which goes through the arbor shaft and is flattened on one side in a manner so that when a set screw is tightened against the same it causes the L-shaped end to swing toward the drum of the wheel and engage against one of the nuts which holds the drum to the hub of the wheel so as to act as a driving key to rotate the wheel with the arbor shaft.

In the drawing forming part of my specification:

Figure 1 illustrates my adjustable lathe attachment as it would appear on a lathe, only a portion of the lathe being illustrated;

Figure 2 is an end view of the attachment;

Figure 3 is an enlarged side view, showing a section through the lathe bed prismatic V's and flat way;

Figure 4 is a plan view of my adjustable lathe attachment;

Figure 5 is a detail of a portion of my adjustable lathe attachment;

Figure 6 is an enlarged detailed section on the line 6—6 of Figure 5.

My adjustable lathe attachment A is adapted to fit upon any ordinary lathe bed and is for the purpose of holding an automobile wheel B in a manner so that the brake drum C of the same, or the wheel or the like, may be trued. In truing a brake drum the tool 10 which is ordinarily supported by the adjustable member 11 of the tool carriage D operates on the carriage D to engage the drum C.

The attachment A includes a base portion 12 which is adapted to be held supported above and on the lathe bed 13 by the adjustable supports 14 and 15. The supports 14 and 15 are held by the bolts 16 to the base 12 adjustable by engagement in the desired openings 17, illustrated in Figure 4, so that the supports 14 and 15 may be spaced apart in a manner so as to ride on the flat way 18 and one of the prismatic V ways 19, as illustrated in Figure 3. It is apparent that these ways may be spaced farther apart or closer together on different sized lathes and therefore, by providing the adjustable lathe attachment A with the supports 14 and 15, respectively the same may be attached to any lathe very readily.

The base 12 is formed with journals 20 and 21 projecting up from the same. These journals 20 and 21 may be adjustable on the base 12 or in some cases they may be formed integral therewith if it is desired. The journals 20 and 21 are adapted to be closed by the journal cover members or caps 22 which are approximately the same dimensions. The journal 21 is made narrower than the journal 20 as will be apparent in Figure 3, to provide the space indicated by 23 between the arrows in this figure, the purpose of which will be later set forth.

An arbor shaft 24 is adapted to be supported in the journals 20 and 21. This shaft may be formed with tapered ends 25, or with ends of any shape desired, the outer end 26 of which may be threaded so that the wheel B may fit upon the end 25 of the arbor shaft 24 to hold the same secured thereto. However, I provide a key slot 27 through the taper 25 adjacent the end of the shaft 24 so that a key may be extended through the same to engage with the key slots of the wheel, not illustrated in the drawing, to hold the wheel against turning on the shaft 24 without making it necessary to tighten it too much on a tapered end 25, so that it would be hard to remove it.

I have illustrated in Figure 5 and in the detail in Figure 6, one of the ends 25 with the key slot 27 into which an L-shaped key 28 may be positioned in a manner so that a set screw 29 will engage against a flattened side of the key 28, forcing the end 30 of the key toward the bolt ends 31 of the wheel B to act as a key adjacent or between the bolts 31 of the wheel to cause the wheel B to be rotated by the key 28 without being tightly secured on the arbor shaft 24.

My lathe attachment is provided with a driving gear 30' which is mounted upon the shaft 24 in a suitable manner to key the same with the shaft. The gear 30' is adapted to be driven by the driving pinion 31', the pinion being driven by the chuck F, securing power from the lathe head 32. It is apparent that the pinion 31' may be driven in any suitable manner from the power from the lathe head 32 of the lathe so as to rotate the pinion in a manner to drive the gear 30' and in turn drive the shaft 24. This rotates the wheel B so that the lathe tool 10 may operate upon the same or in conjunction with the wheel so as to true the wheel in accordance with the desire when it is supported by the attachment A.

It will be apparent that my adjustable lathe attachment is of a very desirable nature because it is built to fit any lathe and may be quickly attached to the respective lathe on which it is desired to be used. A further advantage is that it supports the wheel B to one side of the bed of the lathe E rather than requiring a special type of lathe of a much larger dimension which must be made special for operation to receive automobile wheels and hold them between the tail stock and the driving head so that the lathe tool can operate upon the drum to true the same. These types of lathes are expensive and they are not used often enough to permit the ordinary garage operator to afford such a lathe. My attachment may be applied to any lathe and may be used for other purposes. The pinion 31' may be driven by the lathe dog which is in turn operated from the face plate carried by the head stock of the lathe and driven thereby. My attachment is adapted to be anchored to the flat and prismatic V ways of the lathe by the anchoring bolt 33 which holds the cross bar 34 against the bottom of the bed of the lathe, while the bolt 33 engages into the base 12 of the attachment and anchors the attachment A rigidly in relation to the lathe with the arbor shaft 24 extending virtually in true right angular operating form in relation to the V ways of the lathe E. The journals 20 and 21 support the arbor shaft with the ends thereof projecting outside of the lathe bed and thus it is easy to support a wheel of any diameter, such as B, on any ordinary lathe. The attachment is narrow in its formation so that the tool carriage D may be brought in close proximity therewith, permitting the tool carried thereby to be operated freely on the brake drum C or brought into close proximity to the rotating wheel to determine whether or not the same is true in the rim thereof or otherwise. When the lathe operates the shaft 24 is driven, driving the wheel B, and the same may be readily trued as set forth.

After the wheel has been trued it may be readily removed while still held upon the arbor shaft 24 by removing the caps 22, then sliding the shaft 24 toward the narrow bearing 21 the distance of the space 23, which disengages the gear 30 from the pinion 31, whereupon the arbor shaft 24 may be lifted from the bearings 20 and 21 with the wheel attached thereto. This is the purpose of the space 23 formed by the narrow bearing 21 and the movement of the gear 30' is illustrated in dotted lines in Figure 3. Thus I provide an adjustable lathe attachment which may be used for various purposes although I have described it as being primarily desirable for use to support wheels with brake drums so that the drums may be readily trued by the lathe tool. The construction of the attachment is simple, however, it fulfills a very desirable need for the ordinary garage operator at a low cost and in a most desirable manner because of the accuracy with which the simple attachment may be applied to the lathe and operated in accomplishing the results desired.

Variations may be made by those skilled in the art within the scope of the following claims and such should be considered as a part of this invention.

This application is a substitute for abandoned application #680,803 filed July 17, 1933.

I claim:—

1. In a lathe provided with a bed, guide means on the bed, a head stock at one end of said bed and a tool carriage movable along said guide means; a work supporting attachment for supporting work at right angles to said guide means and laterally of said bed in a position for engagement by a tool supported by said carriage, said attachment comprising a base, means carried by said base engageable with said guide means to support said base above said guide means and in adjusted position relative to said head, clamping means engaging the base and the bed from below the bed for holding said supporting means against movement on said guide means, a shaft rotatably carried by said base and having an end portion thereof projecting laterally of said bed and having means at said projecting end to which the work may be secured, a gear on said shaft, a second gear meshing with said first gear, and an arbor secured to said second gear and engageable with said head for rotation thereby.

2. In a lathe provided with a bed, guide means on the bed, a head stock at one end of said bed and a tool carriage movable along said guide means; a work supporting attachment for supporting work at right angles to said guide means and laterally of said bed in a position for engagement by a tool supported by said carriage, said attachment comprising a base, a pair of supporting members extending below said base, means securing at least one of said supporting members to said base for adjustment relative thereto, a shaft rotatably carried by said base and having an end portion thereof projecting laterally of said bed and having means at said projecting end to which the work may be secured, a gear on said shaft, a second gear meshing with said first gear, and an arbor secured to said second gear and engageable with said head for rotation thereby.

3. In a lathe provided with a bed, guide means on the bed, a head stock at one end of said bed and a tool carriage movable along said guide means; a work supporting attachment for supporting work at right angles to said guide means and laterally of said bed in a position for engagement by a tool supported by said carriage, said attachment comprising a base, supporting means carried by the base engaging the guide members for supporting the base upwardly of said guide means, means engaging the base and the bed from below the bed for holding said supporting means against movement on said guide means, a spindle having means at at least one end to which work may be secured, a beveled gear secured to said spindle intermediate the ends thereof, upwardly extending bearings carried by said base for rotatably supporting said spindle on said base, an arbor engageable with said head for rotation thereby, a beveled gear on said arbor meshing with said first gear, said bearing including a removable cap on at least one bearing having a length greater than the length of said one bearing and engageable with said first gear to hold said first gear in mesh with said second gear, removal of said cap permitting endwise movement of said spindle to thereby disengage said gears.

GUY O. ENOCHSON.